Patented June 28, 1927.

1,634,154

UNITED STATES PATENT OFFICE.

CORNELIS LOURENS, OF AMSTERDAM, NETHERLANDS, ASSIGNOR TO NAAMLOOZE VENNOOTSCHAP ALGEMLINE NORIT MAATSCHAPPIJ, KNOWN AS GENERAL NORIT COMPANY, LIMITED, OF AMSTERDAM, NETHERLANDS, A CORPORATION OF NETHERLANDS.

PROCESS FOR TREATING LIQUIDS.

No Drawing. Application filed November 11, 1922, Serial No. 600,484, and in the Netherlands November 14, 1921.

This invention relates to a process in which gases (which term is intended to embrace gaseous mixtures) are caused to act on liquids or liquefied bodies.

If liquids or solutions and the like are treated with gases, for example, in order to effect an oxidation, a reduction or a destruction of substances present therein, or to form compounds with such substances, the difficulty has been encountered, that the gas cannot easily be brought in intimate contact with all parts of the liquid, so that a great part of the gases pass through the liquid without action thereon and the efficiency of the treatment is low and unsatisfactory.

More especially in case of using gases, which are not easily dissolved by the liquid under treatment, or if the gases are greatly diluted by inert gases or the like, the conditions of obtaining a ready adsorption often are unsatisfactory.

One object of my present invention is, to obtain a ready and more intense action of the gas on the liquid by causing the gas to act or to further act on the liquid in the presence of active carbon, also called decolorizing or activated carbon, e. g. the product known as Norit, though also other active carbons may be used. In general the process is the more effective, if the gas in question is more or less readily and to a great extent adsorbed by the carbon.

A further object of my invention is to use an active carbon of a specific nature as to its appearance and constitution, that is to say a carbon having a more or less fibrous structure, originating from the vegetable or previously carbonized vegetable raw material used.

In many processes of preparing decolorizing carbon this structure is lost and the active carbon obtained in form of a completely amorphous powder.

It can easily be seen, if desired by microscopic determination, whether such a structure is present or not. If the structure of the vegetable raw material is not fully destroyed by the special activation process applied the micro- and macropores of the cellular texture can be observed.

Such carbon with a fibrous-like structure possesses a large capacity as to specific absorption of gases and said absorption exceeds that of kieselguhr, (diatomaceous earth) fuller's earth, common charcoal and the like, very greatly.

The active carbon used according to the present invention may be prepared by artificial activation from carbonaceous material of vegetable or mineral origin by the combined action of heat and added activating substances either in a solid, liquid or gaseous form.

It consists, apart from a relatively small amount of ash which may be present, substantially of carbon in an active state. As instances of the use of solid activating substances calcium carbonate, magnesium carbonate, sodium hydroxide, potassium hydroxide may be mentioned.

As instances of liquid activating substances I may mention sulfuric acid, phosphoric acid, zinc chloride, etc.

As instances of gaseous substances I may mention steam, carbon dioxide, chlorine, etc.

In practicing the process of the present invention the gas or gases acting on the liquid or dissolved substances will, owing to the adsorption-capacity of the carbon, be present wholly or partly on the active surface of the carbon in a highly active condition, and thus enabling the acceleration of the action with the liquid or the dissolved substance.

The process may be carried out in such a way, that the carbon is first impregnated with the gas or gaseous medium and then brought preferably in intimate contact with the liquid to be treated, or the carbon may be suspended in the liquid under treatment and the gas passed through it, preferably by stirring the mixture or by other known means to secure an intimate contact e. g. by using absorption towers or by finely dividing the mixture of liquid and active carbon, etc.

If the gas treatment has for its object to decolorize the liquid as for instance in the treatment of liquids with chlorine, ozone, etc., this action is still increased by the decolorizing capacity of the active carbon, while additionally further impurities or decomposed impurities may simultaneously be removed, as e. g. active carbon removes slimy substances, gums and pectines, improves the flavour, removes bacteria and other microorganisms, etc.

According to the object in view, the nature of the liquid and the gas, etc., the active carbon may first be caused to absorb the gas, preferably after evacuation and cooling of the carbon, which absorption may be effected under pressure. After absorption of the gases by the active carbon the liquid is added to it by mixing or by passing the liquid through it, which operations are preferably performed under pressure. The carbon can also be suspended in pulverized or in divided form in the liquid and the gas passed through the mixture, which operation is also preferably effected under pressure, and in certain cases preferably by cooling the liquid; or the liquid is passed through the carbon in one direction, the latter e. g. being in a more or less granular form and using columns or the like, and the gas in the other direction.

The quantity of active carbon required may be determined by practical experiment taking into account the conditions under which the process is carried out e. g. temperature, pressure, duration of contact, reaction, density, velocity of passing the liquid or the gas or both, the nature of the contact, etc.

In many cases it is desirable to work the process at low temperatures and by applying pressure.

If the gas is first caused to be absorbed by the carbon, this absorption may e. g. be effected while the gas is in the gaseous phase or the gas may be absorbed out of a liquid containing the gas in dissolved state e. g. as described hereafter.

As instances, in which gases are brought into contact with liquids e. g. in order to effect chemical reactions, I may mention: the bleaching or decolorization of liquids and solutions of various nature by oxidation or reduction, of liquid substances or of substances dissolved in a liquid, or in suspension, with chlorine, oxygen, oxygen in a nascent state, ozone, sulfurous acid; the conversion of liquid products into compounds with the gas in question as e. g. in the oxidation of drying or semi-drying oils, the decomposition and/or oxidation of mineral oils, so as to form fatty acids and other products of decomposition; the purification and sterilization of liquids with chlorine, ozone and the like, especially water, in which process organic substances (micro-organisms included) are oxidized, etc.

In many cases, probably because the gas, in addition to an intense contact, is present in an absorbed state, and in high concentration, the reaction is much more effective and greatly accelerated.

If the gas is easily dissolved by the liquid, but if it is desired to accelerate its action on the liquid or on dissolved substances and to subsequently remove it from the liquid, the process may be carried out in such a manner, that part of the liquid is first treated with an excess of gas and subjected to such other conditions which are most favorable for the solution of same in the liquid, whereupon the liquid is brought into contact with the active carbon. The excess of gas (e. g. chlorine in the treatment of water) is then absorbed and removed by the active carbon. In this way the active carbon itself or part of it can be saturated with the gas and may be employed for the treatment of further batches of liquid, to which latter batches no or less gas is dissolved before it comes into contact with the carbon.

In purifying water by chlorine, I may e. g. proceed in the following manner: Chlorine in excess (in a gaseous or in a dissolved state) is added to a certain batch of the water, which water may be prefiltered by sand filters or the like to obtain a partial removal of the coarsest impurities. The water containing chlorine e. g. 50 mgr. or more per litre is passed through filters or the like containing active carbon, and the excess of chlorine together with other impurities are absorbed by the active carbon until practically free of chlorine. As soon as the water leaving the filter begins to contain free chlorine, the addition of chlorine to the water passing the filter is stopped or decreased. A plurality of filters may be used, if required in battery forms, the latter containing fresh active carbon (e. g. in granular form) as a safety measure. In certain cases the direction of passing the water through the filter or filters may be reversed. In the above mentioned process the active carbon assists the purifying action of the chlorine materially owing to the absorption by the carbon of the products of oxidation formed and of the inorganic, organic, and suspended impurities.

Instead of passing the liquid through a column of carbon, the liquid can also be passed through a filter in which the carbon (preferably in a finely divided condition) is kept in suspension.

As a further instance of treating liquids with a gas I mention the treatment of liquids with ozone, by passing ozone (or ozone containing gaseous mixture) through the liquid containing active carbon in suspension, or by passing the liquid and ozone according to the counter current principle through a column filled with active carbon. In this manner I obtain much more effective action of ozone and the loss of ozone reduced to a minimum. If, owing to the action of ozone on organic bodies, acid reacting substances are formed the removal of which is desired, precipitated calcium carbonate or other insoluble carbonate may be added to the liquid after treatment.

The active carbon, after it has been used for any purpose whatsoever, and after its absorption capacity has greatly or too much diminished, may be revivified by subjecting same to reburning or by treating it with chemical agents, such as strong acids alkalis, oxidation or reduction agents or a suitable combination of said methods.

If the active carbon is dried or burned previous to its application it may also remove water from a nonaqueous liquid or solution such as oil.

The degasification or evacuation (removal of gaseous matter) of the active carbon (e. g. by burning or heating preferably in vacuo) prior to its use with liquids or prior to the incorporation or impregnation of the gas therewith, as well as the more or less completely removal of inorganic and organic impurities, is often highly desirable.

What I claim is:

1. In a process in which a gaseous agent is caused to act upon a liquid material, the step of subjecting the liquid material to the action of gas in the presence of active carbon.

2. In a process in which a gaseous agent is caused to act upon a liquid material, the step of subjecting the liquid material to the action of the gas in the presence of active carbon of vegetable origin having a fibrous structure originating from the raw material used in making the same.

3. In a process in which a gaseous agent is caused to act upon a liquid, the step of passing the gas through the liquid in the presence of active decolorizing carbon.

4. In the process of purifying water by treating the same with chlorine gas, the step of treating the water with chlorine gas, in the presence of active decolorizing carbon.

5. The process of treating a liquid, which comprises subjecting the same to the action of active carbon previously impregnated with a gas, capable of acting upon impurities contained in the said liquid.

6. The process as covered in claim 5, in which a decolorizing carbon is used, which possesses a fibrous physical structure derived from the structure of the vegetable raw material, from which the said carbon has been made.

7. In the process of treating a liquid with a gas, the step of first evacuating active decolorizing carbon, then incorporating a gas with said active carbon, and then subjecting the liquid to the action of the active carbon carrying such gas.

8. In the process of treating liquids with gases, the improvement which comprises first impregnating a liquid with a gas, then bringing the liquid into contact with active carbon, and thereafter separating the active carbon from the liquid.

9. In the process of treating a liquid with a gas, the improvement which comprises first impregnating the liquid with the gas, then bringing the liquid into contact with active decolorizing carbon, until the carbon is largely saturated, and then subjecting such carbon to treatment with a further amount of the liquid, containing less gas than the liquid used in the first step.

10. In the purification of water, the improvement which comprises adding chlorine in excess to a batch of water, then bringing the water containing chlorine in excess, into contact with active decolorizing carbon, and subsequently passing further quantities of water containing less chlorine through the active decolorizing carbon remaining from material used in its preparation.

11. The process of treating a liquid which comprises subjecting it to the combined action of a reactive gas and active carbon having a fibrous structure derived from the raw material uesd in its preparation.

12. The process of purifying a liquid which comprises subjecting the liquid to the action of an active purifying gas in the presence of active carbon.

In testimony whereof I affix my signature.

CORNELIS LOURENS.